United States Patent

Baldeschwieler

[15] 3,665,192
[45] May 23, 1972

[54] LABELING OF MOLECULES USING THE PERTURBED ANGULAR CORRELATION OF GAMMA RADIATION

[72] Inventor: John D. Baldeschwieler, 221 Durazno Way, Menlo Park, Calif. 94025

[22] Filed: Nov. 28, 1969

[21] Appl. No.: 880,778

[52] U.S. Cl....................250/71.5 R, 250/83.3 R, 250/106 T
[51] Int. Cl.............................................................G01t 1/20
[58] Field of Search......................250/71.5 R, 83.3 R, 106 T

[56] References Cited
UNITED STATES PATENTS

| | | | |
|---|---|---|---|
| 3,414,383 | 12/1968 | Murphy | 250/71.5 X |
| 3,452,201 | 6/1969 | Hall, Jr. | 250/83.3 |
| 3,489,522 | 1/1970 | McConnell | 250/106 T X |

*Primary Examiner*—Archie R. Borchelt
*Attorney*—Limbach, Limbach & Sutton

[57] ABSTRACT

A method of studying molecular motion and orientation by labeling a molecule with a radio active tracer having a half life of an excited state generally comparable to the nuclear relaxation time in this state and measuring the rotational correlation time of a molecule from the perturbed angular correlation.

14 Claims, 10 Drawing Figures

INVENTOR.
JOHN D. BALDESCHWIELER
BY
Limbach, Limbach & Sutton
ATTORNEYS

INVENTOR.
JOHN D. BALDESCHWIELER
BY
Limbach, Limbach & Sutton
ATTORNEYS

LABELING OF MOLECULES USING THE PERTURBED ANGULAR CORRELATION OF GAMMA RADIATION

The invention described herein was made in the course of work under a grant or award from the Department of Health, Education, and Welfare.

BACKGROUND OF THE INVENTION

A number of labeling techniques have recently been developed for the study of rotational correlation times, internal motions, and conformational changes in biological macromolecules. In one such method, the depolarization or decay of fluorescence of small chromophores can be used to measure the rotational correlation time of the chromophore bound to a macromolecule. In another method, the motion and orientation of stable free radicals bound to biomolecules are monitored by electrons in resonance. In a third method, halide ions have been used as chemical probes for nuclear magnetic resonance studies of proteins labeled with metal atoms.

These labeling techniques share a number of general features. Information on localized behavior of the macromolecule near the labeling site is usually accessible. In many instances, the labels can be incorporated into interesting regions of the macromolecule by using selective and specific chemical methods. Labels have been bound chemically to substrate or inhibitor molecules which subsequently interact with active regions of enzymes or antibodies.

On the other hand, there is always some uncertainty as to how much the label affects the system being studied. Particularly is this true where free radicals or reactive ions are used for the study. Moreover, the foregoing labeling techniques lack sensitivity for use in low concentrations or in vivo. Decay of fluorescence techniques require optical transparency for operation which greatly limits its potential use. ESR and NMR techniques demand large scale and expensive equipment for operation.

SUMMARY OF THE INVENTION AND OBJECTS

The present invention relates to a method of studying static and dynamic molecular behavior by affixing a radiation emitter to the moving molecule, detecting the perturbed angular correlation and measuring the rotational correlation time to determine the behavior of the molecule.

It is an object of the present invention to provide an improved method of determining molecular movement rapidly using a label which does not influence the molecule to be studied and which may be used in vivo at low concentrations without the requirement of major equipment.

It is a further object of the invention to determine molecular movement orientation, structure, order and conformation by studying perturbed angular correlation.

DESCRIPTION OF THE PREFERRED EMBODIMENTS

The direction of emission of radiation, such as gamma rays, from a sample containing radioactive nuclei is generally isotropic. However, when two gamma rays that are emitted successively from a system of three excited states in nuclear de-excitation are detected in coincidence, the coincidence counting rate $W(\theta,t)$, may depend strongly on the angle $\theta$ between their directions of propagation. The angular correlation in the directions of emission of a gamma ray cascade can be perturbed by the interaction of nuclear moments in the intermediate state with fluctuating external fields.

By study of the perturbed angular correlation of gamma radiation from a radioactive nucleus, the nuclear relaxation time can be measured to yield the rotational correlation time, $\tau c$ of a molecule to which the radioactive nucleus is bound. The use of radioactive nucleus as a "rotational tracer" to label molecules thus offers the possibility of obtaining the information available with other labeling methods, but with the sensitivity, instrumental simplicity and in vivo applicability of radioactive tracer techniques.

A large number of radioactive nuclei are acceptable. Selection of the proper one depends upon a variety of factors. To measure a nuclear relaxation time, the time a nucleus takes to change its orientation, using the perturbed angular correlation of gamma radiation, it is desirable to select a radioactive nucleus having a half life in the intermediate nuclear excited state generally comparable to the nuclear relaxation time. This means that the radioactive nucleus should usually have a relatively long half life and the nuclear electric quadrupole moment in the intermediate state should be large.

Figure 1:
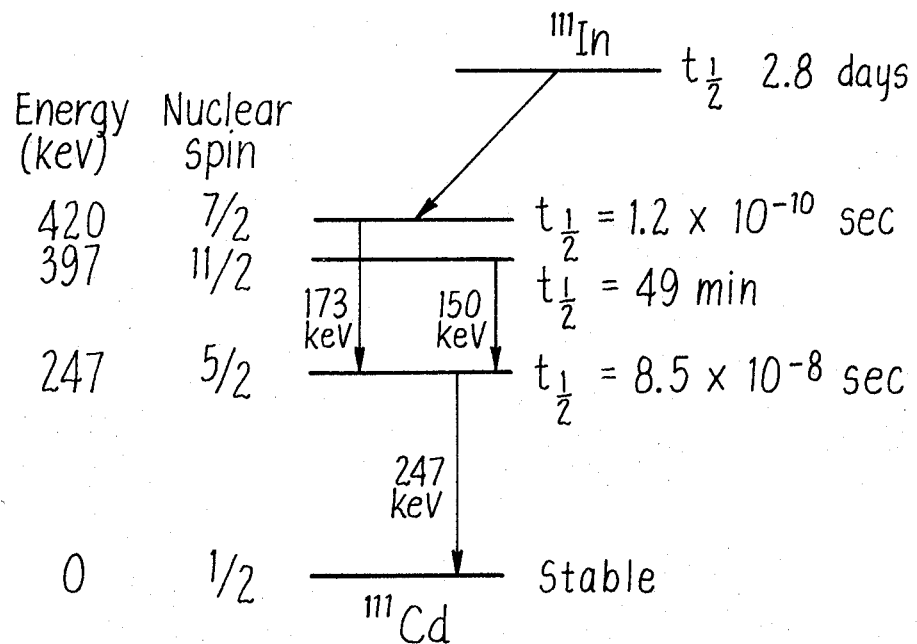
FIG. 1 is a chart illustrating the energy level scheme of $^{111}Cd$.

For example, the 173–247 keV gamma ray cascade in $^{111}Cd$ can be used for the study of the nuclear relaxation time in the 247 keV state. FIG. 1 shows the cascade in $^{111}Cd$ following electron capture decay of $^{111}In$. As shown in FIG. 1, the energy level scheme of $^{111}Cd$ also includes a 49 minute metastable state at 397 keV. This state may be populated using the reaction $^{110}Cd(n,\gamma)^{111}Cd$., and nuclear relaxation in the 247 keV state can be studied by using the 150–247 keV cascade. By using this $^{111}Cd$ metastable state, the potentially large recoil effects from the $^{111}In$ electron capture decay are eliminated and only cadmium chemistry is involved.

Examples of other radioactive nuclei having states with convenient properties are shown in the following table, where E is energy of the intermediate state of the cascade measured in keV; T ½ is the half life of the state; and I is the intrinsic spin characterizing the state:

TABLE 1

| Nucleus | E (kev.) | T½ (10⁻⁹ sec.) | I |
|---|---|---|---|
| $F^{19}$ | 197 | 85 | $\frac{5+}{2}$ |
| $Sc^{44}$ | 68 | 153 | 2+ |
| $Fe^{56}$ | 845 | 0.0073 | 2+ |
| $As^{75}$ | 280 | 0.24 | $\frac{5-}{2}$ |
| $Tc^{99}$ | 181 | 0.27 | |
| | | 3.57 | $\frac{5+}{2}$ |
| $Cd^{111}$ | 247 | 85 | $\frac{5+}{2}$ |
| $Sn^{118}$ | 254 | 22 | 5- |
| $Sn^{120}$ | 90 | 5.5 | 5- |
| $Cs^{133}$ | 81 | 6.31 | $\frac{5+}{2}$ |
| | 160 | 0.085 | |
| $Ce^{140}$ | 2,083 | 3.41 | 4+ |
| $Pm^{147}$ | 92 | 2.44 | $\frac{5+}{2}$ |
| $Sm^{152}$ | 125 | 1.4 | 2+ |
| $Gd^{154}$ | 123 | 1.2 | 2+ |
| $Gd^{156}$ | 89 | 2.0 | 2+ |
| $Dy^{160}$ | 87 | 1.8 | 2+ |
| $Er^{166}$ | 80 | 1.82 | 2+ |
| | 265 | 0.123 | 4+ |
| $Er^{168}$ | 80 | 1.92 | 2+ |
| $Tm^{169}$ | 118 | 0.062 | |
| $Lu^{175}$ | 114 | 0.066 | $\frac{9+}{2}$ |
| $Hf^{177}$ | 113 | 0.42 | $\frac{9-}{2}$ |
| | | 0.52 | |

Table I—Continued

| Nucleus | E (kev.) | $T_{1/2}$ ($10^{-9}$ sec.) | I |
|---|---|---|---|
| $Hf^{178}$ | 93 | 1.45 | 2+ |
| $Hf^{180}$ | 93 | 1.53 | 2+ |
|  | 308.6 | 0.081 | 4+ |
| $Ta^{181}$ | 482 | 10.8 | $\frac{5+}{2}$ |
| $W^{182}$ | 100 | 1.37 | 2+ |
| $W^{184}$ | 111 | 1.28 | 2+ |
| $Re^{187}$ | 206 | 570 | $\frac{9-}{2}$ |
| $Os^{186}$ | 137 | 0.84 | 2+ |
| $Os^{188}$ | 155 | 0.73 | 2+ |
| $Hg^{199}$ | 158 | 2.33 | $\frac{5-}{2}$ |
| $Tl^{203}$ | 279 | 0.28 | $\frac{3+}{2}$ |
| $Pb^{204}$ | 1,274 | 260 | 4+ |
| $Np^{237}$ | 59.6 | 0.6 | $\frac{5-}{2}$ |

The foregoing table is not exclusive and other nuclei may be used subject to the limitation that half life and nuclear relaxation time be generally comparable. While any one of these nuclei may be used in place of the cadmium system described above, it is preferred to select a nucleus from the group consisting of $Sc^{44}$, $Fe^{56}$, $As^{75}$, $Cd^{111}$, $Sn^{118}$, $Sn^{120}$, $Hg^{199}$, $Tl^{203}$, and $Pb^{204}$ because the chemical properties and reactions are well understood and generally useful.

Figure 2:
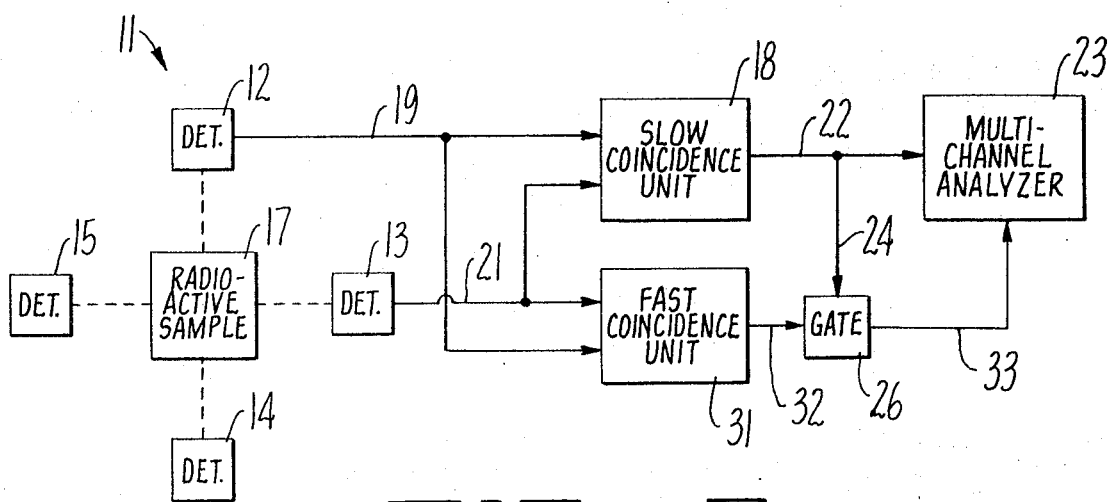
FIG. 2 is a schematic diagram of the spectrometer which may be used in performing the method of the present invention.

Angular correlation measurements may be made using any suitable apparatus. One apparatus which has been found to be satisfactory, is shown in the schematic diagram of FIG. 2. This is a four-detector fast-slow gamma ray coincidence spectrometer. Spectrometer 11 has four detectors 12, 13, 14 and 15. The detectors may conveniently be made of NaI(Tl) crystals and are arranged at cardinal points around radioactive source 17. The angular coincidence measurements are made by using various pairs of detectors 12 through 15 at angles of 90° or 180° to the radioactive source 17. For example, detector 12 is used to detect a first gamma ray while detector 13 is used to detect a second gamma ray in the cascade in the successive emission in nuclear deexcitation. The slow coincidence unit 18 receives signals from the detectors 12 and 13 through wires 19 and 21, respectively, and discriminates the energies of the gamma rays involved in the cascade. The output pulse from slow coincidence unit 18 proceeds through wire 22 to multi-channel analyzer 23 of known design. The output pulse from slow coincidence unit 18 also gates, through wire 24 to gate 26, the fast side of the spectrometer presently to be described.

The fast coincidence unit 31 also receives the signals from detectors 12 and 13 through wires 19 and 21 respectively. Fast coincidence unit 31 includes a time-to-amplitude converter. This converter sends a pulse through wire 32, gate 26, and wire 33 to multi-channel analyzer 23. The pulse has an amplitude proportional to the delay time between the arrival of the two gamma rays. The multi-channel analyzer 23 then provides a direct display of perturbed angular correlation v. delay time.

In using the aforementioned $^{111}Cd$ system, the coincidence counting rate may be determined as follows. Using the 173–247 keV gamma ray cascade in $^{111}Cd$ following the decay of $^{111}In$, as shown in FIG. 1, $W(\theta,t)$ is given by $$W(\theta, t) = \frac{1}{\tau} e^{-t/\tau}[1 + A_2 P_2 (\cos \theta)] \quad (1)$$

where $P_2$ is the Legendre polynominal $(3 \cos^2\theta - 1)/2$, $\tau$ is the mean lifetime of the intermediate nuclear state, t is the time interval between emission of the two gamma rays, and the coefficient $A_2 = -0.20$. For the 247 keV state of $^{111}Cd$, $\tau = t_{1/2}/\ln 2 = 1.21 \cdot 10^{-7}$ seconds. For the 150–247 keV cascade starting from the 49 minute metastable state, $W(\theta,t)$ is also given by equation (1) within $A_2 = +0.161$.

The angular correlations of both the 173–247 and 150–247 keV cascades can be perturbed by interaction of the nuclear quadrupole moment of $^{111}Cd$ in the 247 keV state with fluctuating electric field gradients at the nucleus. In this case, the coefficient of $P_2(\cos \theta)$ can be written as $A_2 G_2(t)$ in equation (1) where $G_2(t)$ is an attenuation coefficient. For an unperturbed correlation, $G_2 = 1$ and the observed coefficient $A_2 G_2(t)$ is independent of the delay time, $t$, between the arrival of the two gamma rays. When the angular correlation is perturbed, the coefficient $A_2 G_2(t)$ of course depends on $t$, and the experimental results may conveniently be displayed by plotting the anisotropy, $$A(t) = \frac{W(\pi, t)}{W(\pi/2, t)} - 1 \quad (2)$$

against the delay time $t$. The shape of this plot depends in detail on the relative magnitude of the molecular rotational correlation time, $\tau_c$, and the size of the nuclear quadrupole interaction, $e^2qQ$, in the intermediate state.

EXAMPLE 1.

Figure 3A:
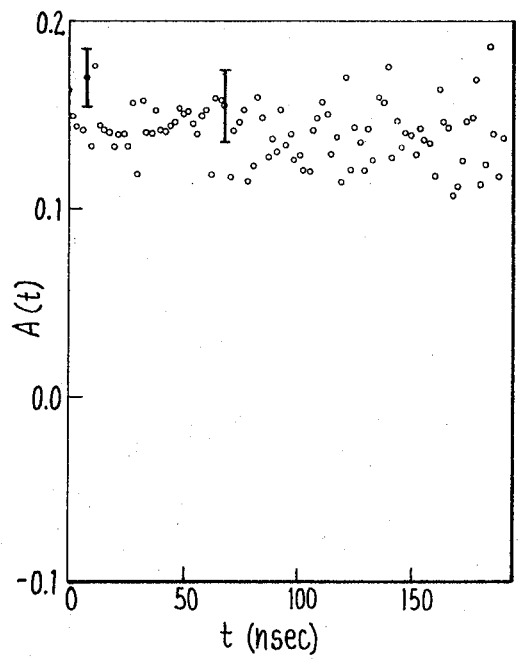
FIG. 3a is a plot of the anistropy, A(t) as a function of delay time, $t$, in nanoseconds for $^{111m}Cd^{2+}$ in 0.5 M NaCl solution buffered at pH 6.1 with 0.1 M phosphate.
Figure 3B:
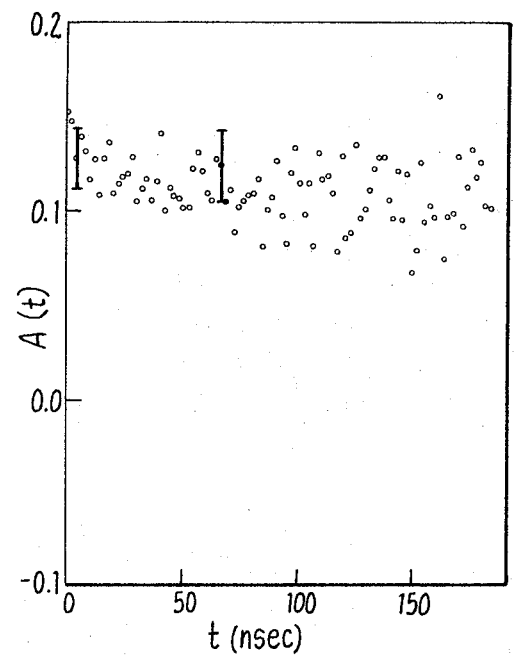
FIG. 3b is a plot of the anisotropy for $^{111m}Cd^{2+}$ in the presence of $3 \times 10^{-4}$ M native carbonic anhydrase in the above buffer solution.
Figure 4A:
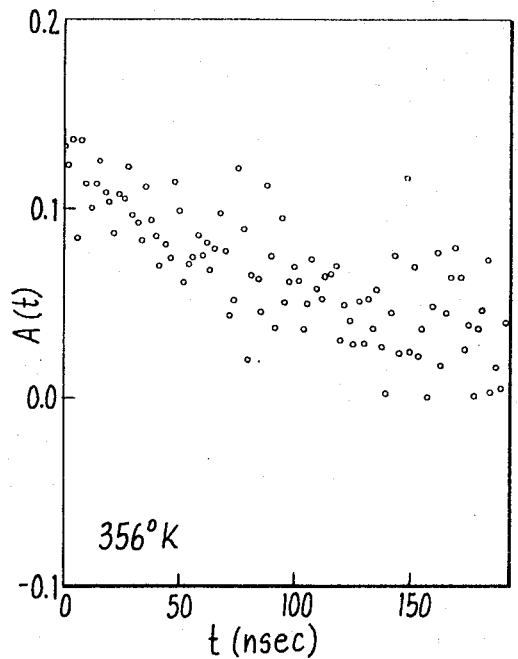
FIGS. 4a thru 4e are plots of anisotropy at various temperatures for $^{111m}Cd^{2+}$ solutions containing 1M N-benzyliminodiacetic acid (NBIDA) at pH 8.3 and 25° C.
Figure 3C:
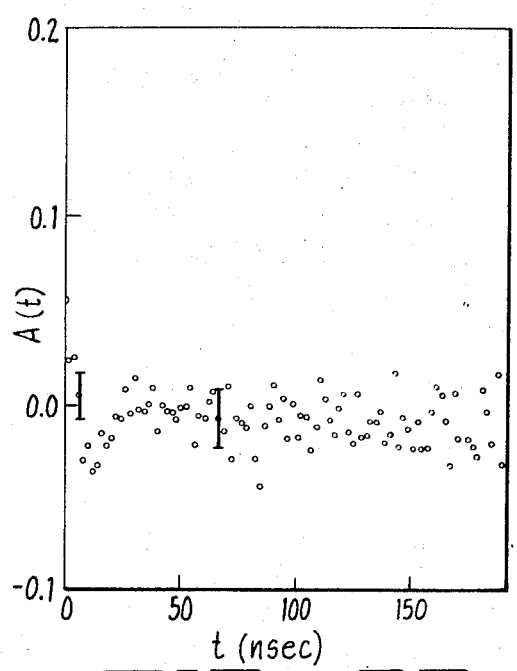
FIG. 3c is a plot of the anisotropy for $^{111m}Cd^{2+}$ in the presence of $2.5 \times 10^{-4}$ M apo-carbonic anhydrase in the buffer solution.
Figure 4B:
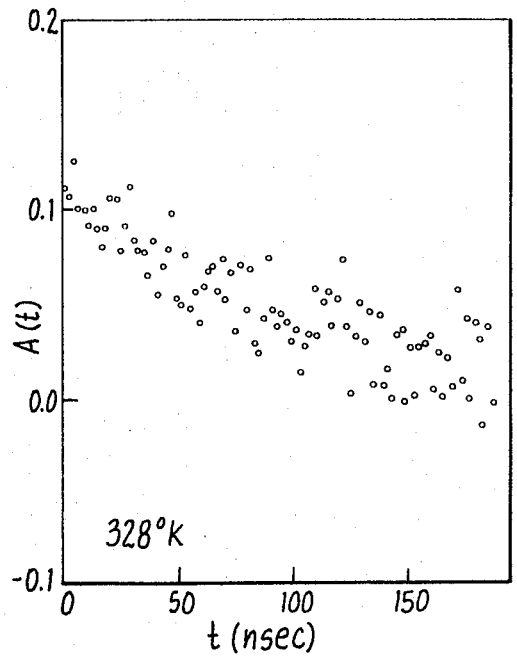
Figure 4C:
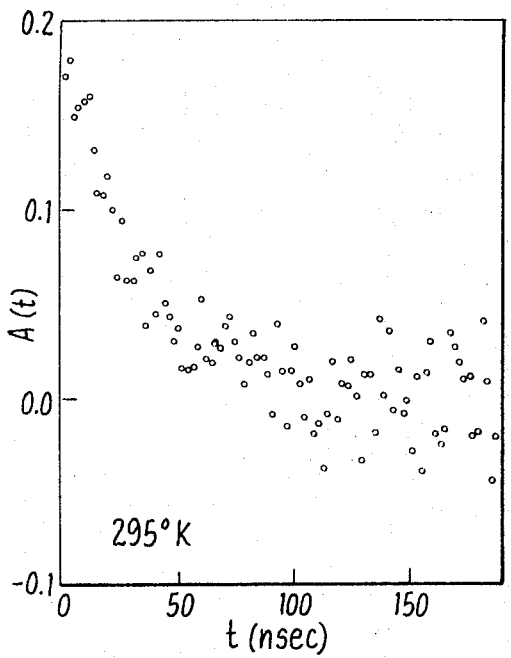
Figure 4D:
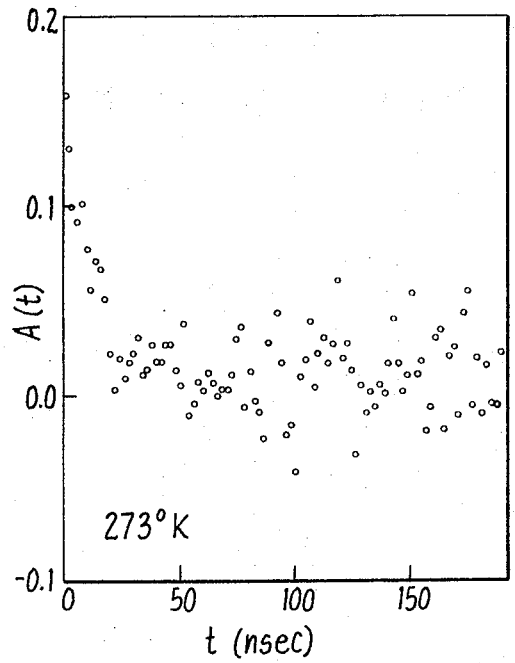
Figure 4E:
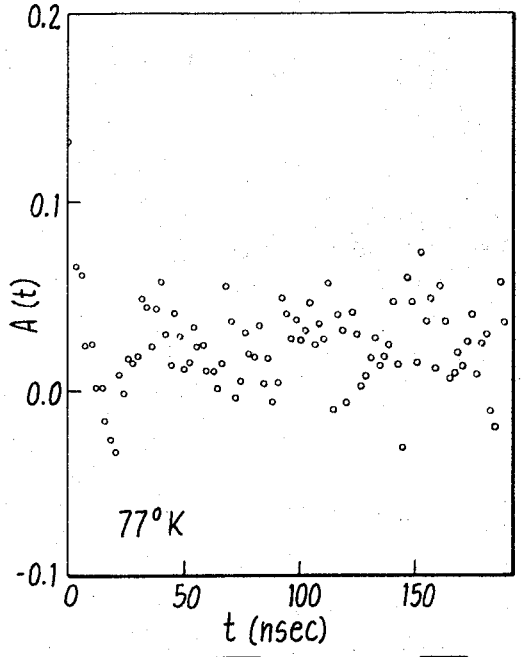

FIGS. 3a–c are plots showing the anisotropy as a function of delay time for $^{111m}Cd^{2+}$ ion in the presence of native carbonic anhydrase, and $^{111m}Cd^{2+}$ ion in the presence of apo-carbonic anhydrase, respectively.

FIG. 3a shows the anisotropy of $^{111m}Cd^{2+}$ in 0.5 M sodium chloride solutions buffered to pH 6.1 with 0.1 M phosphate where the experimental anisotropy $A(t)$ is plotted against the delay time, $t$, in nanoseconds. The decay of the anisotropy is approximately exponential indicating that the angular correlation is only weakly perturbed, charactieristic of the free ion in solution, for which both $e^2qQ$ and $\tau_c$ are small.

FIG. 3b shows the anisotropy for buffered $^{111m}Cd^{2+}$ in the presence of $3 \times 10^{-4}$ M native carbonic anhydrase. The samples of native enzyme were prepared by adding to 4 ml of the enzyme solution 0.5 ml of a $2 \times 10^{-3}$ M solution of radioactive cadmium chloride. The anisotropy plot is again characteristic of the free ion in solution.

FIG. 3c shows the anisotropy for $^{111m}Cd^{2+}$ in the presence of $2.5 \times 10^{-4}$ M apo-carbonic anhydrase in the same buffer. The anisotropy drops sharply from its initial value and exhibits a minimum. The correlation is strongly perturbed. The particular time dependence for $A(t)$ in this case approaches that observed in polycrystalline solids. The shape of the plot suggests that time-independent quadrupole interactions are mainly responsible for the perturbation of the angular correlation.

Under these conditions, the nuclear quadrupole interaction $e^2qQ$ is much larger than the molecular rotational correlation time, $\tau_c$. The net result is that the nuclear spin system is effectively "immobilized." FIG. 3c then indicates that the cadmium ion is rigidly bound to the apo-enzyme, and that the motion of the metal-enzyme complex is slow compared to $1/(e^2qQ)$ for $^{111}Cd$ in the 247 keV state.

Native carbonic anhydrase was demonstrated to be enzymatically active and was then dialyzed to make apo-carbonic anhydrase. 15 ml of $3 \times 10^{-4}$ M carbonic anhydrase in 0.1 M acetate buffer at pH 5.0 was dialyzed for 48 hours against one liter of $10^{-2}$ M orthopenanthroline in the same buffer. The orthopenanthroline was removed by dialysis against three one-liter solutions of 0.1 M phosphate buffer at pH 6.1 containing 0.5 M NaCl. The concentration of the enzyme was determined spectrophometrically using the extinction coefficient of $4.9 \times 10^4$ $M^{-1}$ at 280 $m\mu^{15}$. The three samples of each substance were studied, each containing approximately a micromole of cadmium.

EXAMPLE 2.

The radioactive label can be made highly specific by designing chemical complexes which bind tightly to the radioactive nucleus. In many cases, then, these complexes can be bound chemically to substrate or inhibitor molecules which can be subsequently incorporated into interesting regions of macromolecules. The Cd label can for example be bound with a tight chemical complexing agent such as EDTA which is covalently linked with an active group such as a sulfhydryl reagent. With this general scheme, concern with the details of cadmium chemistry and binding constants can be eliminated, and the chemical selectively of the method then depends on the choice of the active group covalently linked to the complex.

FIGS. 4a thru e show the anisotropy at various temperatures for a series of cadmium solutions containing 1 MN-benzyliminodiacetic acid (NBIDA). Since the correlation time for the motion of the metal ion-NBIDA complex is a function of temperature, these plots provide qualitative examples of the behavior of the perturbed angular correlation as a function of the rotational properties of the complex. The plot for the frozen solution is clearly similar to the plot for the apo-enzyme as shown in FIG. 3c. The other curves demonstrate that a continuous variation in behavior for the angular correlation may be expected as the molecular rotational correlation time for the complex changes.

The NBIDA molecule complexes the $Cd^{2+}$ ion, and also has a functional group which can be modified to react with high specificity at free sulfhydral groups in macromolecules.

In addition to measuring the molecular rotational correlation time as a function of temperature as in Example 2, the radioactive label may be used to observe the behavior of biological macromolecules in vivo. The concentrations of the radioactive label may be as low as $10^{-12}$ molar. For example, precisely when a change in conformation of a molecule can be detected upon changing the external field. Taking pH as an example, if the molecule changes from helix to random coil upon change in pH, study of delayed coincidence spectrum shows at what pH the change takes place. A helical conformation gives a spectrum with a single minimum, whereas a random coil gives a curve with an exponential decay. In addition, the method of the present invention is also used to study the details of molecular motion and conformation of non-biological molecules in solution, surface layers, powders, composite materials, materials on bearing surfaces of moving machinery, etc. Orientation of a labeled molecule is readily determined by analyzing the spectrum. If the plot shows a series of minima, the labeled molecules are generally oriented in the same direction. The spacing of the minima depends on the orientation of the principal axis of the array with respect to the direction of the first emission.

The delayed coincidence spectrum of the radio active label in a single crystal or in an ordered array of molecules shows characteristic minima. An ordered array of molecules will give rise to a delayed coincidence spectrum which exhibits a series of minima. For a randomly orientated array of molecules, only the first of these minima remains. Fibers, tendons and membranes are examples of ordered arrays of molecules that may be studied. Molecular motion, orientation and order are thus conveniently determined by analysis of the delayed coincidence spectrum.

In addition to labeled carbonic anhydrase, as in Example 2, molecular motion and conformation of the following molecules have been satisfactorily studied with rotational tracers: bovine serum albumen (BSA), BSA dimer and poly-l-glutamic acid. These molecules may conveniently be studied independently to determine characteristic properties. Then, knowing the characteristic delayed coincidence spectrum exhibited by the labeled molecule, the molecule may be introduced into a larger macromolecule at the area of interest. For example, where structure of a cleft in the macromolecule is to be studied, a rotational tracer of known size may be attached to the macromolecule to determine the tightness of "-fit" of the rotational tracer within the macromolecule. In this way, the size of the cleft in a macromolecule can be generally determined. Where a smaller rotational tracer is incorporated into the same cleft of the macromolecule, a looser "fit" may be reflected by greater movement of rotational tracer as reflected in the delayed coincidence spectra. The net effect of the macromolecule and the rotational tracer may be measured by analysis of the delayed coincidence spectrum. If a single minimum occurs, the attachment of the rotational tracer is rigidly bound to the macromolecule and moves with a rotational correlation time that is long with respect to the inverse of the quadrupolar interaction. Where, on the other hand, the delayed coincidence spectrum exhibits an exponential decay, a loosely bound tracer is indicated.

A large number of labels may be prepared, depending upon the intended purpose. It is preferred to have three elements to the radioactive tracer or label. The first element, of course, is the radioactive emitter, preferably selected from the group contained in Table 1. The second element is a complexing agent to firmly bind the radioactive emitter. The third element is a functional group attached to the chemical complex.

By way of example, complexing agents may be of the porphyrin type or of the ethylene diamine tetraacetic acid type. Acetylacetone, together with derivatives of these complexing agents, are satisfactory. Many other chemical complexing agents are known and any one suitable for complexing with the radioactive emitter may be used.

Similarly, a wide variety of functional groups may be bound to the complex. As previously indicated, sulfhydryl reagents such as phenyl mercury, are highly satisfactory. These are covalently bound to the complexing agent. Another suitable functional group to be covalently bound to the complex is the iodoacetate group. Enzyme substrates or inhibitors may be also bound as functonal groups to the complex as may alkylating agents and hydrophobic moieties. More broadly, any active group that can conveniently be attached to the complex may be employed as the functional group.

These radioactive labels may then be reacted, by means of the functional group, to any material to be studied, such as biological macromolecules, synthetic polymers, and membranes.

It will therefore be apparent that a tracer which does not react with the system under study may be used according to the present invention. Accordingly, the method of the present invention may be used in vivo, at low concentrations and rapidly with modest equipment. The radioactive label can be made highly specific by incorporating the radioactive nucleus in a chemical complex which is bound covalently to another chemical functional group with highly specific reactivity.

I claim:

1. In a method of studying molecular behavior the steps of affixing a radiation emitter to the molecule to be studied, said radiation emitter giving two emissions in the same state, detecting the perturbed angular correlation of a cascade of radiation emitted, plotting anisotropy in angular correlation against delay time in the arrival of the two emissions, whereby change in behavior of the molecule is determined.

2. A method as in claim 1, wherein the behavior studied is molecular motion and the rotational correlation time is measured, whereby molecular motion is determined.

3. A method as in claim 1, wherein the behavior studied is molecular orientation in an array of molecules to each of which a radiation emitter is affixed, and measuring the successive minima in the plot of anisotropy versus delay time whereby orientation of the array is determined.

4. A method as in claim 1 wherein the behavior studied is order in an array of molecules to each of which a radiation emitter is affixed, and measuring the order of the successive minima whereby order of the array is determined.

5. A method as in claim 1 wherein the behavior studied is structure and the emitter is first affixed to a label molecule of known properties which, in turn, is associated with the molecule to be studied at the area of structural interest to determine the net effect of the label and molecule under study upon rotational correlation time, whereby the structural characteristics of the molecule are determined.

6. A method as in claim 1 wherein the behavior studied is conformation and the emitter is first affixed to a label molecule of known properties which, in turn, is associated with the molecule to be studied at the area of conformational interest to determine the net effect of the label and molecule under study upon rotational correlation time, whereby the conformational characteristics of the molecule are determined.

7. A method as in claim 1 wherein the radiation emitter is a member of the group consisting of $Sc^{44}$, $Fe^{56}$, $As^{75}$, $Cd^{111}$, $Sn^{118}$, $Sn^{120}$, $Hg^{199}$, $Tl^{203}$, and $Pb^{204}$.

8. A method as in claim 1 wherein the molecule to be studied is a biological macromolecule in vivo.

9. A method as in claim 1 wherein the nuclear relaxation time for the state of the radioactive emitter is comparable to its half life in the same state.

10. In a method of preparing a material to be studied with a radioactive label, the steps of binding a radiation emitter to a chemical complexing agent having at least one functional group, said emitter giving two emissions in the same state and reacting the functional group with a material to be studied.

11. A method as in claim 10 wherein the complexing agent is selected from a group consisting of acetylacetone, ethylene diamine tetraacetic acid, porphyrins and derivatives thereof.

12. A method as in claim 10 wherein the radiation emitter is a member of the group consisting of $Sc^{44}$, $Fe^{56}$, $As^{75}$, $Cd^{111}$, $Sn^{118}$, $Sh^{120}$, $Hg^{199}$, $Tl^{203}$, and $Pb^{204}$.

13. A radioactive rotational tracer for measuring rotational correlation time consisting of a radiation emitter giving two emissions in the same state complexed to a complexing agent and having a functional group capable of attaching to a material to be studied.

14. A tracer as in claim 13 wherein the nuclear relaxation time for the state of the radioactive emitter is comparable to its half life in the same state.

* * * * *